United States Patent
Kinney

(10) Patent No.: US 9,764,897 B1
(45) Date of Patent: Sep. 19, 2017

(54) PALLET HAVING POSTS AND STACKING BELLS TO ALLOW STACKING WHILE LOADED WITH STEEL SHEETS

(71) Applicant: Randy W. Kinney, Lincoln, NE (US)

(72) Inventor: Randy W. Kinney, Lincoln, NE (US)

(73) Assignee: Randy W. Kinney, Lincoln, NE (US)

( * ) Notice: Subject to any disclaimer, the term of this patent is extended or adjusted under 35 U.S.C. 154(b) by 0 days.

(21) Appl. No.: 15/426,743

(22) Filed: Feb. 7, 2017

Related U.S. Application Data

(60) Provisional application No. 62/292,854, filed on Feb. 8, 2016.

(51) Int. Cl.
| | |
|---|---|
| *B65G 1/02* | (2006.01) |
| *B65D 19/10* | (2006.01) |
| *B65D 19/40* | (2006.01) |
| *B65D 19/06* | (2006.01) |

(52) U.S. Cl.
CPC ............... *B65G 1/02* (2013.01); *B65D 19/06* (2013.01); *B65D 19/40* (2013.01); *B65D 2519/0094* (2013.01); *B65D 2519/0095* (2013.01); *B65D 2519/0096* (2013.01); *B65D 2519/00273* (2013.01); *B65D 2519/00278* (2013.01); *B65D 2519/00293* (2013.01); *B65D 2519/00323* (2013.01); *B65D 2519/00363* (2013.01); *B65D 2519/00432* (2013.01); *B65D 2519/00796* (2013.01); *B65D 2519/00965* (2013.01)

(58) Field of Classification Search
CPC .......... B65G 1/02; B65D 19/06; B65D 19/40; B65D 2519/00273; B65D 2519/00278; B65D 2519/00293; B65D 2519/00323; B65D 2519/00363; B65D 2519/00432; B65D 2519/00796; B65D 2519/0094; B65D 2519/0096; B65D 2519/00437; B65D 2519/00442; B65D 2519/0095; B65D 2519/00965
USPC .......... 211/153; 108/53.1, 53.3, 57.22, 57.31
See application file for complete search history.

(56) References Cited

U.S. PATENT DOCUMENTS

| | | | | |
|---|---|---|---|---|
| 3,465,897 | A * | 9/1969 | Heinz | A47B 53/00 211/151 |
| 6,279,763 | B1 * | 8/2001 | Bush | A47B 43/00 108/55.1 |
| 7,491,024 | B2 * | 2/2009 | Heinrichs | B65D 19/12 108/53.1 |
| 2009/0272705 | A1 * | 11/2009 | Francis | A47F 5/12 211/126.12 |

FOREIGN PATENT DOCUMENTS

ZA   WO 2010041222 A1 *   4/2010   ............ B65D 19/12

* cited by examiner

*Primary Examiner* — Michael Safavi
(74) *Attorney, Agent, or Firm* — David H. Milligan PC LLO

(57) ABSTRACT

The present invention provides a system for stacking, storing, and loading metal sheets. In accordance with a preferred embodiment, the present invention provides a pallet which includes multiple posts that allow alignment of sheets of material on the pallet. Preferably, the pallet further includes posts which include stacking bells which allow the pallets to stack together while preventing damage to loaded materials. In accordance with one preferred embodiment of the present invention, the pallets may be stored in a specially designed rack.

1 Claim, 7 Drawing Sheets

Detail C

Top View

Detail A

Detail B

Detail C

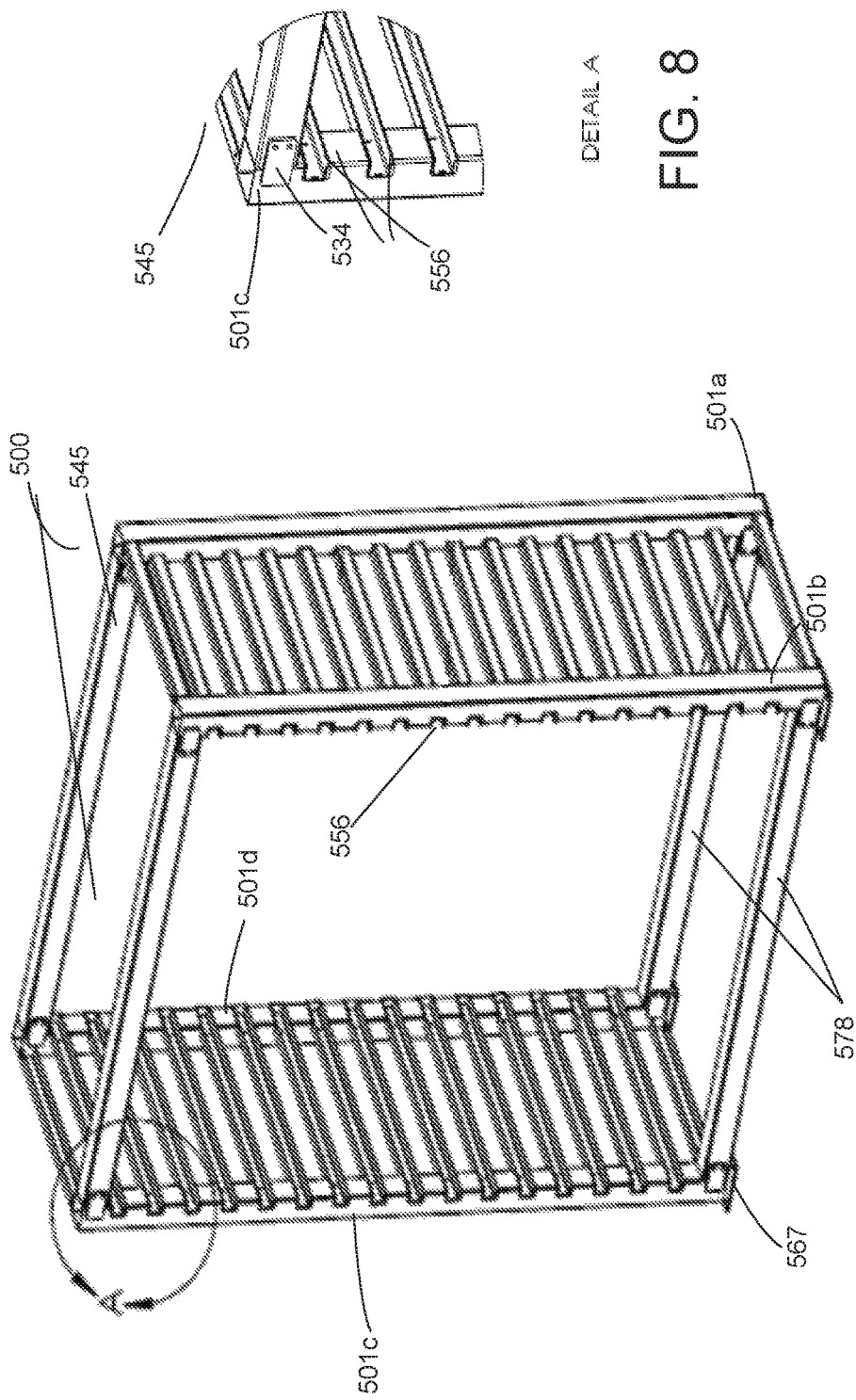

PALLET HAVING POSTS AND STACKING BELLS TO ALLOW STACKING WHILE LOADED WITH STEEL SHEETS

RELATED APPLICATIONS

The present application claims priority to U.S. Provisional Application No. 62/292,854 filed Feb. 8, 2016.

FIELD OF INVENTION

The present invention is related in general to pallets and, in particular, to a pallet designed for holding, storing and transporting sheets of steel and other materials.

BACKGROUND OF THE INVENTION

Traditional wooden and plastic pallets lack the durability and strength necessary for stacking metal sheeting. Currently, industry standards include banding stacks of metal sheets and inserting pieces of lumber between each banded stack to create a point of insertion for a forklift. The present methods lack uniformity and limit how high banded stacks can be built up and stacked. Further, current methods are wasteful in terms of space requirements and labor resources and they create workplace safety issues as a great deal of time and effort are spent manually transporting and handling steel sheets.

Based on the foregoing, there is a need for an improved system for stacking and storing metal sheeting. A system in which metal sheeting may be stacked uniformly by providing a structure that holds stacks of metal sheets and prevents shifting is needed. Such a system would allow the user to: easily transport and store metal sheeting; stack pallets of metal sheeting in a safe, uniform manner; and allow the sheeting to be loaded directly into an automation machine for laser cutting if desired. The present invention overcomes the prior art shortcomings by accomplishing these critical objectives.

SUMMARY OF THE DISCLOSURE

To minimize the limitations found in the prior art, and to minimize other limitations that will be apparent upon the reading of the specifications, the preferred embodiment of the present invention provides a system for stacking, storing, and loading metal sheets.

In accordance with a preferred embodiment, the present invention provides a pallet which includes multiple posts that allow alignment of sheets of material on the pallet. Preferably, the pallet further includes posts which include stacking bells which allow the pallets to stack together while preventing damage to loaded materials. In accordance with one preferred embodiment of the present invention, the pallets may be stored in a specially designed rack.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

FIG. 7 shows a perspective view of a rack for receiving multiple steel pallets in accordance with a preferred embodiment of the present invention.

FIG. 8 shows an enlarged view of section A of the rack shown in FIG. 7.

DETAILED DESCRIPTION OF THE DRAWINGS

In the following discussion that addresses a number of embodiments and application of the present invention, reference is made to the accompanying drawings that form a part hereof, and in which is shown by way of illustration specific embodiments in which the invention may be practices. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
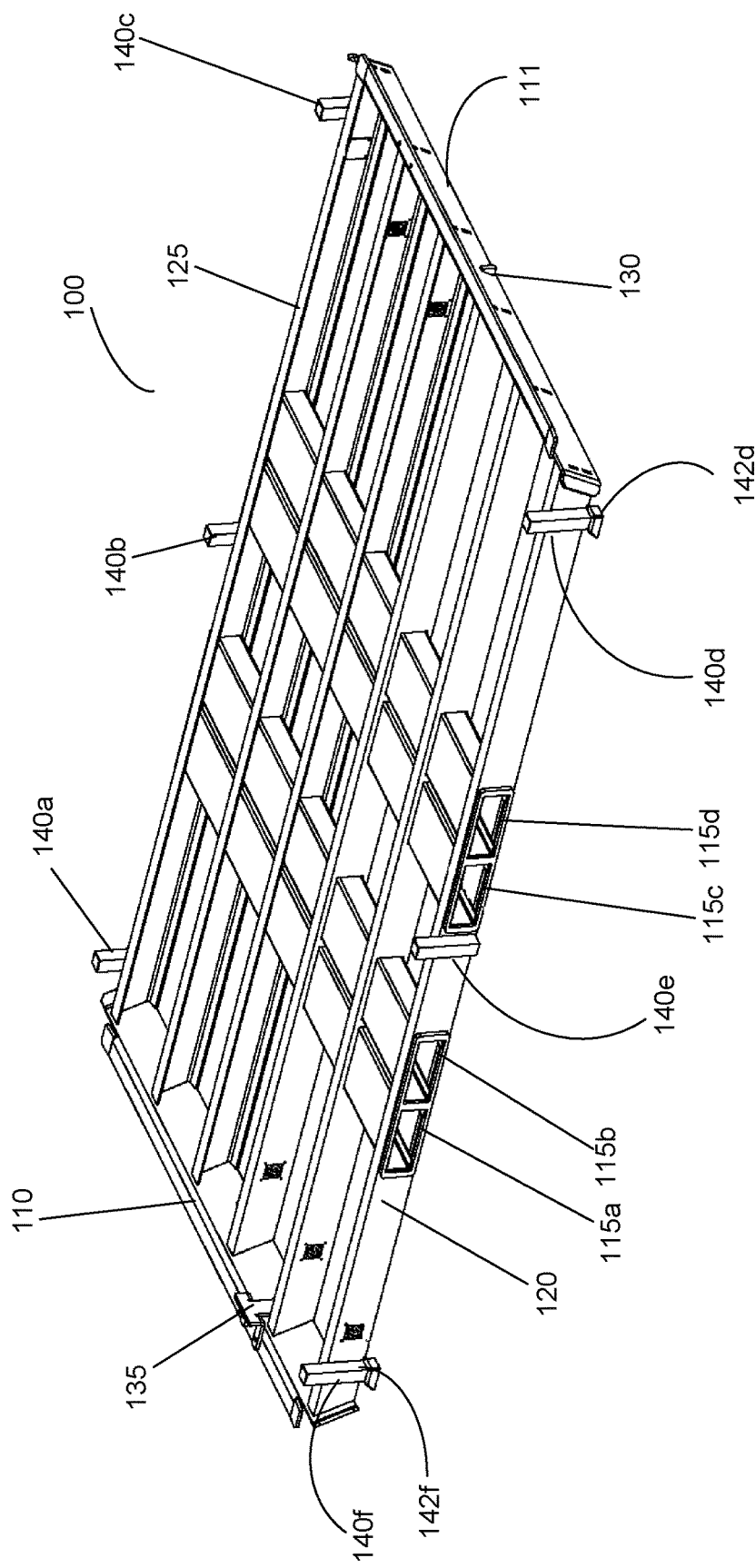
FIG. 1 shows a perspective view of a pallet in accordance with a preferred embodiment of the present invention.

With reference now to FIG. 1, an exemplary pallet in accordance with a preferred embodiment of the present invention will now be discussed.

As shown in FIG. 1, exemplary pallet 100 preferably includes a front rail 120, a back rail 125, a left support rail 110 and a right support rail 111. Preferably, fork pockets 115*a-d* are provided which run through the front rail 120 and the back rail 125. The pallet 100 as shown further includes a support posts 140*a-f* which are spaced around the outer rails of the pallet. As further shown, support posts 140*a*, 140*c*, 140*d* and 140*f* on the corners of the pallet 100 further include stacking bells 142*d*, 142*f* (stacking bells for posts 140*a* and 140*c* are not shown). Further, the pallet 100 preferably includes a pallet end stop 135 and a rail end stop 130

Figure 2:
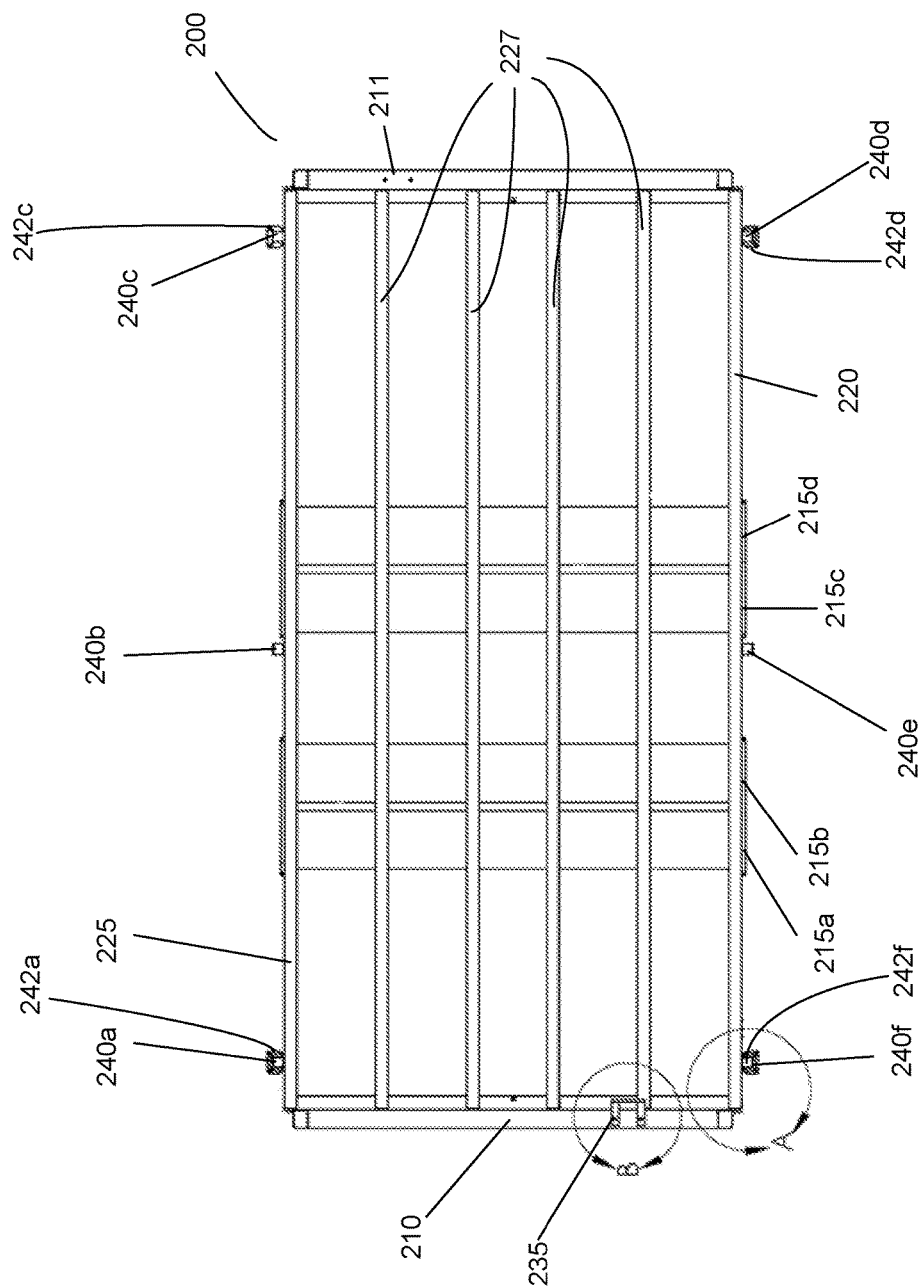
FIG. 2 shows a top view of a pallet in accordance with a preferred embodiment of the present invention.

With reference now to FIG. 2, a top view of the exemplary pallet will now be further discussed. As shown, the pallet 200 preferably includes a front rail 220, a back rail 225, a left support rail 210 and a right support rail 211. Preferably, fork pockets 215*a-d* are provided which run through the front rail 220 and the back rail 225. As shown, the exemplary pallet 200 further includes support posts 240*a-f* which are spaced around the outer rails of the pallet 200. As further shown, support posts 240*a*, 240*c*, 240*d* and 240*f* on the corners of the pallet 200 preferably further include respective stacking bells 242*a*, 242*c*, 242*d* and 242*f* to allow for the stacking of pallets as discussed further below. Additionally, pallet 200 preferably further includes a pallet end stop 235 and internal rails 227.

Figure 3A:
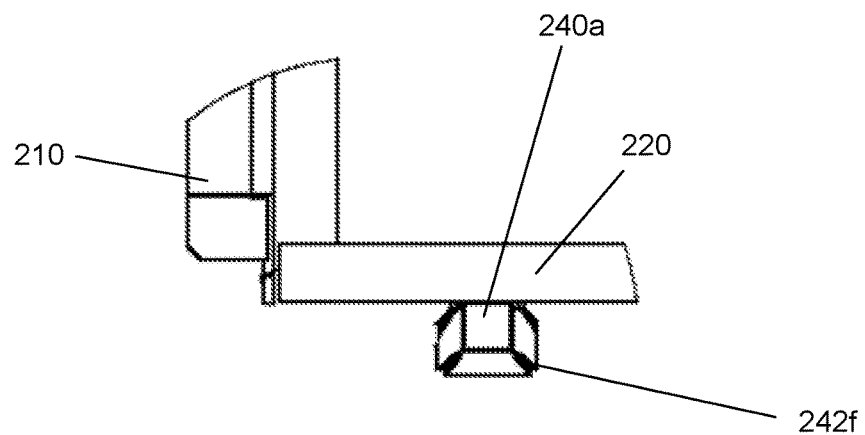
FIG. 3A shows an enlarged view of section A show in FIG. 2.

With reference now to FIG. 3A, a detailed view of area A of FIG. 2 is provided. As shown, the detail A of FIG. 3A includes the left support rail 210, the front rail 220 and the support post 240*a* which includes stacking bell 242*f*.

Figure 3B:
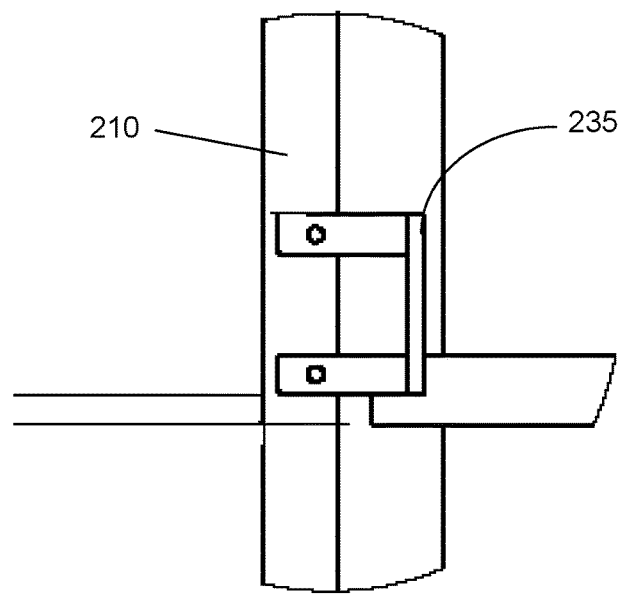
FIG. 3B shows an enlarged view of section B shown in FIG. 2.

With reference now to FIG. 3B, a detailed view of area B of FIG. 2 is provided. As shown, the detail B of FIG. 3B includes the left support rail 210 and the pallet end stop 235.

Figure 4:
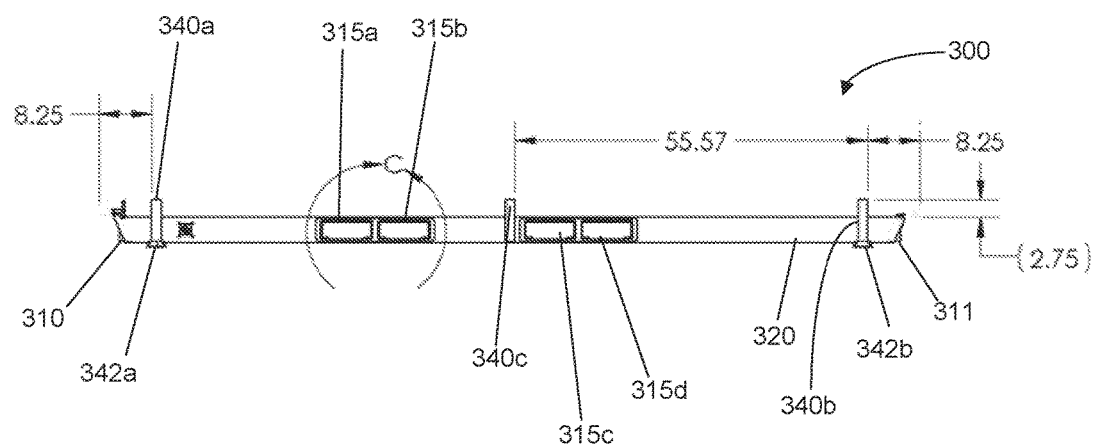
FIG. 4 shows a front view of a pallet in accordance with a preferred embodiment of the present invention.

With reference now to FIG. 4, an exemplary front view of a preferred embodiment of the present invention will now be discussed. As shown in FIG. 4, the exemplary pallet 300 includes a left support rail 310, a right support rail 311 and front rail 320 with fork pockets 315*a-d* which extend through the front rail 320. As further shown, the pallet 300 includes support posts 340*a*, 340*b* and 340*c*. As shown, the corner support post 340*a* includes stacking bell 342*a*; and corner support post 340*b* includes stacking bell 342*b*.

Figure 5:
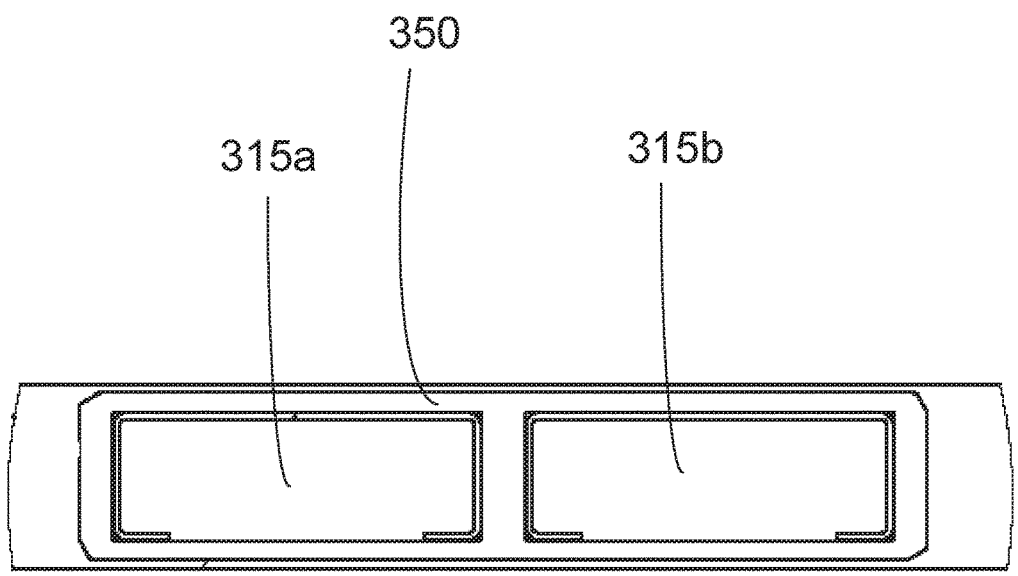
FIG. 5 shows an enlarged view of section C shown in FIG. 4.

With reference now to FIG. 4, a detailed view of area C of FIG. 4 is provided. As shown, the detail C of FIG. 5 shows exemplary fork pockets 315*a* and 315*b* which are surrounded by supporting ring 350.

Figure 6:
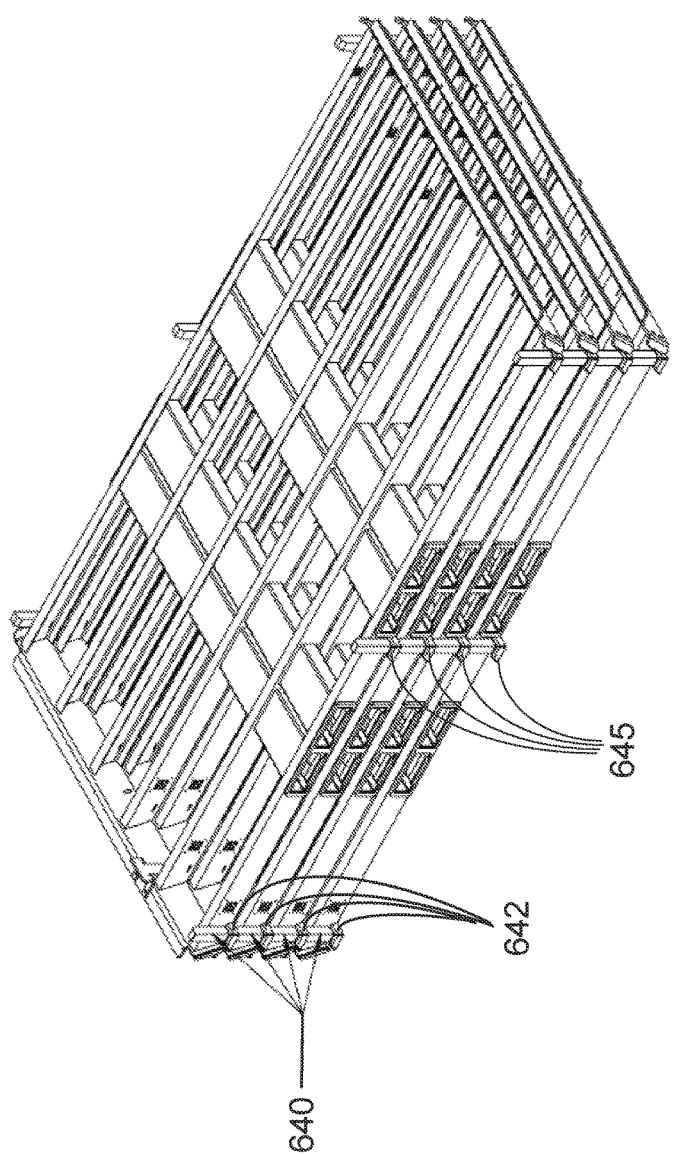
FIG. 6 shows a perspective view of stacked pallets in accordance with a preferred embodiment of the present invention.

With reference now to FIG. 6, an exemplary stack of four pallets in accordance with one aspect of the present invention is shown. As illustrated, the pallets are stacked by aligning the upper pallets so that each stacking bell 642 of an upper pallet rests on a support post 640 of the pallet below it. In the exemplary pallets shown in FIG. 6, each pallet includes additional center stacking bells 645. According to a preferred embodiment, these center stacking bells may be included (as shown) or used only on the corner support posts as illustrated in FIGS. 1-4.

As discussed above, the exemplary pallet of the present invention preferably is constructed of steel or similar materials. However, any material may be used within the scope of the present invention. Further, the pallet of the present invention is discussed herein specifically with respect to the carrying and transporting of sheets of steel. However, it should be understood that this is an exemplary use of the present invention and other materials may be transported and benefit from the present invention as well.

With reference now to FIG. 7, a rack for receiving multiple steel pallets in accordance with a further preferred embodiment of the present invention will now be discussed. As shown in FIG. 7, the rack 500 for receiving multiple steel pallets includes lower connecting rails 578, upper connecting rails 545 and four vertical posts 501*a*-501*d* resting on feet 567. As further shown in FIG. 5A, the rack 500 further includes lateral shelving slots 556 for receiving multiple steel pallets which can slide into the shelving slots 556 from either side of the rack 500. According to a preferred embodiment, the lateral shelving slots 556 are preferably spaced such that any pallet being lifted and removed will not contact the pallet being stored above it. According to a further preferred embodiment, the height of the lateral shelving slots 556 may preferably be limited so that any pallet being removed will contact the top of the slot before the posts on the lifted pallet can contact the bell(s) of the pallet being stored above it. This spacing and height restriction may preferably be used to eliminate the safety risk of mistakenly removing two pallets at one time and overloading the forklift. According to a preferred embodiment, the lateral shelving slots 556 are preferably spaced such that any pallet being lifted and removed will not contact the pallet being stored above or below it.

With reference now to FIG. 8, an enlarged view of the area A shown in FIG. 7 will now be discussed. As shown in FIG. 8, the front rail 545 may be connected to vertical post 501*c* via a fastener 534. As further shown, the shelving slots 556 may be formed from L shaped lateral brackets.

The foregoing description of the preferred embodiment of the present invention has been resented for the purpose of illustration and description. It is not intended to be exhaustive or to limit the invention to the precise form disclosed. Many modifications and variation are possible in light of the above teachings. It is intended that the scope of the present invention not be limited by this detailed description, but by the claims and the equivalents to the claims appended hereto.

What is claimed is:

1. A system for loading and stacking metal sheeting, the system comprising:
    a first pallet, wherein the first pallet is comprised of:
        a plurality of supporting rails, wherein the supporting rails comprise at least a front rail, a back rail, a left support rail, and a right support rail; wherein the supporting rails are connected to form four corners;
        a plurality of pockets, wherein the plurality of pockets extend through the front rail and the back rail;
        a supporting ring surrounding the plurality of pockets;
        a plurality of support posts, wherein the plurality of support posts are attached to and extend up from the plurality of supporting rails; further wherein a supporting post is located on each corner of the first pallet;
        a plurality of stacking bells, wherein at least one stacking bell is located beneath each of the supporting posts located on each corner of the first pallet;
        wherein the plurality of stacking bells are arranged to rest atop a plurality of supporting posts of a second pallet of identical design; further wherein the supporting posts of the first pallet are arranged to support a third pallet of identical design stacked above the first pallet;
    a pallet end stop;
    a rail end stop; and
    a rack for supporting and receiving multiple pallets for stacking metal sheeting, wherein the rack is configured to allow each pallet to be individually removed from the rack without engaging a second pallet.

* * * * *